United States Patent [19]
Sohner et al.

[11] Patent Number: 5,018,165
[45] Date of Patent: May 21, 1991

[54] COMMUNICATION SYSTEM USING SPREAD SPECTRUM AND LEAKY TRANSMISSION LINE

[75] Inventors: Harold K. Sohner, Richardson; Joel N. Hoyloak, Lucas; John T. Spradling, Van Alstyne, all of Tex.

[73] Assignee: Andrew Corporation, Orland Park, Ill.

[21] Appl. No.: 496,774

[22] Filed: Mar. 21, 1990

[51] Int. Cl.$^5$ .............................................. H04K 1/00
[52] U.S. Cl. ..................................................... 375/1
[58] Field of Search .............................. 375/1; 380/34

[56] References Cited

U.S. PATENT DOCUMENTS

| | | | |
|---|---|---|---|
| 4,672,605 | 6/1987 | Hustig et al. | 375/1 |
| 4,850,036 | 7/1989 | Smith | 374/1 |
| 4,866,732 | 9/1989 | Carey et al. | 375/1 |
| 4,866,733 | 9/1989 | Morishita | 375/1 |

*Primary Examiner*—Salvatore Cangialosi
*Attorney, Agent, or Firm*—Arnold, White & Durkee

[57] ABSTRACT

A spread spectrum communication system uses a leaky coaxial cable for cost effective radio communication in enclosed areas. The system includes radio units which communicate with a transceiver, the transceiver being coupled to the leaky coaxial cable. Full-duplex communication includes a first frequency band for transmitting spread spectrum signals from the transceiver to the radio units at power levels which are adjusted to take advantage of the losses associated with leaky coaxial cable, and a second frequency band for transmitting spread spectrum signals from the radio units to the transceiver at the more conventional spread spectrum power levels speicified by the FCC. The present invention employs this split band configuration to accommodate communication over leaky coaxial cable without expensive and bulky filtering for isolation between the transmit and receive signals.

22 Claims, 2 Drawing Sheets

COMMUNICATION SYSTEM USING SPREAD SPECTRUM AND LEAKY TRANSMISSION LINE

FIELD OF THE INVENTION

The present invention relates generally to radio communication systems and, more particularly, to radio communication systems employing spread spectrum and radiating transmission line technologies.

BACKGROUND OF THE INVENTION

Spread spectrum technology has been known for some time. A spread spectrum system is one in which the transmitted signal is spread over a wide frequency band. Typically, the frequency band over which the transmitted signal is spread is wider, by a substantial margin, than the minimum bandwidth required to transmit the information being sent. For example, a spread spectrum system may convert a base-band signal having a bandwidth of a few kilo-Hertz (kHz) to a spread spectrum signal having a bandwidth of many Giga-Hertz (GHz), and transmit the signal using that wider bandwidth.

Spread spectrum signals are typically generated using code modulation such as frequency hopping or direct sequence coding. Because of this code modulation, the power transmitted is low in any narrow frequency region. The power density of a spread spectrum signal is far less than that of more conventional signals in which all the transmitted power is sent in a band of frequencies commensurate with the baseband information bandwidth.

Spread spectrum communication provides a number of advantages over more conventional types of communication systems. These advantages include selective addressing capability, coupled access for code division multiplexing, message screening from eavesdroppers and low-density power spectra for signal hiding. These characteristics are useful and highly desirable in many types of radio communication systems. These and other characteristics of spread spectrum technology are described in SPREAD SPECTRUM SYSTEMS, edited by Robert C. Dixon, published by John Wiley & Sons, Inc. (1984).

For purposes of background information dealing with conventional spread spectrum systems, as well as for supplemental information dealing with modular yet conventional segments of the illustrative embodiments set forth herein, the reader's attention is directed to the following references: U.S. Pat. Nos. 4,455,651, and 4,086,504, dealing with wireless systems employing spread spectrum techniques; U.S. Pat. No. 4,438,519, dealing with a narrow bandwidth spread spectrum system using an AC power line as an antenna; U.S. Pat. No. 4,475,208, concerning a voice/data spread spectrum system; U.S. Pat. No. 4,320,514, dealing with a spread spectrum radio receiver for frequency hopped signals; and U.S. Pat. No. 4,672,605, dealing with a data/voice communication system based on spectrum spreading.

One rather unique type of radio communication system employs a radiating (or "leaky") transmission line, such as leaky coaxial cable, throughout a confined area to provide coverage in that area. Leaky transmission line is advantageous, because it provides for total coverage of a restricted area. Thus, it is not uncommon to find leaky transmission line in tunnels, offices and other areas that are frequency-blocked from externally located wide area coverage communication systems.

Combining leaky transmission line with spread spectrum technology in a single system, to realize the advantages of both technologies, has been recognized as a worthwhile objective. For example, in U.S. Pat. No. 4,866,732 these technologies are described as part of a single system having radio units communicating over a radiating transmission line, with each radio unit communicating using a uniquely assigned spreading code. Unfortunately, there are problems associated with the implementation of this technological combination which have not been overcome.

A fundamental problem with such a system involves regulations defined by the Federal Communications Commission (FCC). The FCC has allocated certain bands for use of spread spectrum radio transmissions having a power level of up to one Watt. These FCC bands are commonly referred to as the Industrial, Scientific and Medical (ISM) bands and are respectively assigned to the frequency ranges of 902–928 MHz, 2400–2483.5 MHz and 5725–5850 MHz. Although operation at 2400–2483.5 MHz is conceivable with leaky coaxial cable, there remains a number of unsolved problems concerning coupling losses and attenuation in leaky coaxial cable at this frequency. Moreover, due to attenuation, leaky coaxial cable is not typically useful for frequency transmissions in excess of 2 GHz. Thus, the most practical ISM band is in the 902–928 MHz region.

The 26 MHz bandwidth in the 902–928 MHz region is, however, narrow and complicates full-duplex spread spectrum communication over leaky coaxial cable. This is because a 26 MHz bandwidth does not allow for the provision of sufficient isolation between the transmit and receive signals without the aid of extensive filtering tools, which can be expensive and occupy an excessive amount of space.

Accordingly, there is a need for a spread spectrum communication system using leaky coaxial cable that can be implemented in a cost effective manner while overcoming the afore-mentioned problems.

SUMMARY OF THE INVENTION

It is a general object of the present invention to provide a spread spectrum communication system which uses leaky transmission line to provide communication in a prescribed communication coverage area.

It is a more specific object of the present invention to provide a full-duplex spread spectrum communication system using leaky coaxial cable to provide communication within the guidelines established by the FCC in a cost-effective and space-conscious manner.

According to a preferred embodiment, the present invention provides a communication system comprising a leaky transmission line coupled to a transceiver for providing two-way radio coverage in separated first and second frequency bands. The leaky transmission line is used for receiving, propagating and transmitting spread spectrum radio signals in a prescribed coverage area, and the transceiver is used for providing spread spectrum signals to the leaky transmission line in a first frequency band and at a first predetermined power level. A plurality of radio units, situated within the prescribed coverage area, receive the spread spectrum signals transmitted from the leaky transmission line in the first frequency band and transmit spread spectrum signals to the transceiver, via the leaky transmission line, in the second frequency band. These bands are selected with respect to the transmission restrictions set forth by the FCC. Further, the leaky transmission line decreases the power level of the spread spectrum signals provided by the transceiver means to a second preselected power level so as not to encroach the guidelines set forth by the FCC concerning spread spectrum signals.

Preferably, the power level of the signals leaving the transceiver is set, according to the coupling and attenuation losses of the cable, so as to maximize the power level of the signals radiating from the cable without exceeding the threshold. It is in this manner that the leaky transmission line may be used to decrease the power level of the spread spectrum signals provided by the transceiver means to the second preselected power level.

BRIEF DESCRIPTION OF THE DRAWINGS

Other objects and advantages of the present invention will become apparent upon reading the following detailed description and upon reference to the drawings in which.

Figure 1:
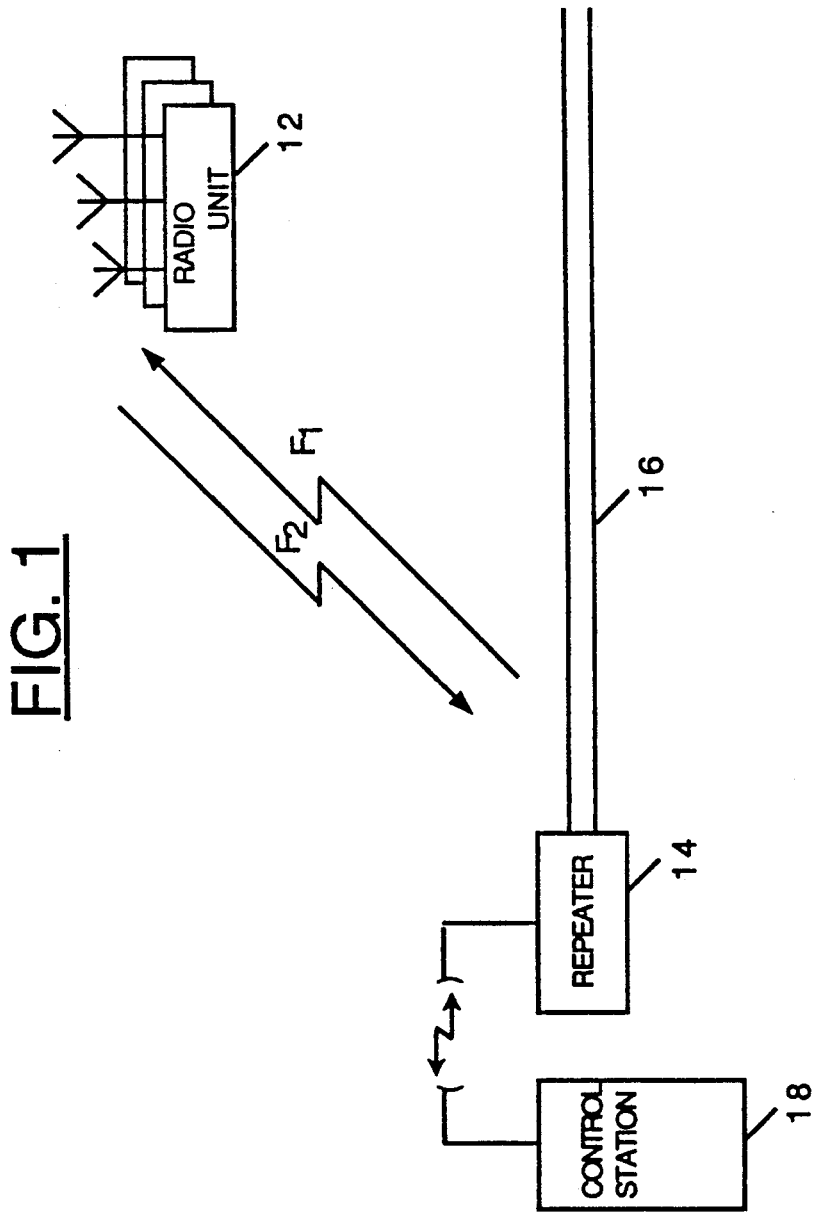
FIG. 1 is a block diagram of a radio communication system, illustrating one embodiment of the present invention.

While the invention is susceptible to various modifications and alternative forms, specific embodiments thereof have been shown by way of example in the drawings and will herein be described in detail. It should be understood, however, that it is not intended to limit the invention to the particular forms disclosed. On the contrary, the intention is to cover all modifications, equivalents, and alternatives falling within the spirit and scope of the invention as defined by the appended claims.

DETAILED DESCRIPTION OF THE PREFERRED EMBODIMENTS

The present invention is directed to spread spectrum communication systems employing radiating (or leaky) transmission lines, e.g., leaky coaxial cables for two-way radio communication, for example, full-duplex or half-duplex communication. Because of certain problems that are solved by the present invention, it is especially suited for a spread spectrum system providing full-duplex communication in narrow coverage areas.

Referring now to FIG. 1, the present invention is illustrated in the form of a radio communication system having radio units 12 and a control station 18. Actual coupling of radio frequency (RF) signals between the control station 18 and the radio units 12 can be accomplished in several ways. By way of illustration only, the representative system of FIG. 1 includes a repeater 14, which may be a transceiver or translator, and a leaky transmission line 16 for such coupling. The repeater 14 may include a conventional bi-directional amplifier and transceiver means (not shown) suitable for transmission of the spread spectrum signal. These elements are used to provide two-way radio communication from the control station 18 to the radio units 12 in a first radio frequency band (F1), and in a second frequency band (F2) from the radio units 12 to the control station 18. More specifically, the leaky transmission line is in the form of radiating cable of either the slotted type or other form wherein the slots or other openings disposed on the metallic outer conductor of the cable permit a controlled portion of the electromagnetic signals being transmitted therethrough to propagate along the length of the cable so that any radio units 12 disposed in the vicinity of such leaky transmission line may receive the signals being radiated therefrom. The leaky transmission line approach is particularly advantageous in bi-directional communication systems because electromagnetic signals transmitted near the transmission line lengths are coupled into the radiation slots and carried back along the length of the cable to the control station.

Accordingly, RF signals transmitted by mobile or portable radio units in the RF coverage area of the control station 18 can be picked up directly by the leaky transmission line 16 and relayed to the control station 18. Signals transmitted from the control station 18 to the radio units 12 travel in essentially the opposite manner.

In a similar arrangement, by using other repeaters 14, the control station 18 can also link radio units 12 in different coverage areas defined by respective leaky transmission lines 16. This configuration is useful in a number of different kinds of two-way radio systems. For example, it may used in cellular telephone communication or trunked radio communication, or in vehicle telemetry applications where a test vehicle (e.g., auto, bus, military wheeled or track vehicle) is connected to a data acquisition computer using spread spectrum radio communications over leaky transmission line. Another application is in a factory, office or institution where leaky transmission line is distributed therethrough to provide the necessary coverage.

In the second frequency band, communication from the radio unit 12 to the control station 18 may be implemented using conventional spread spectrum technology at conventional power levels. For example, this signal path may include either direct sequence or frequency hopping type spread spectrum communication where the signals are transmitted in the 902–928 MHz region and at conventional power levels into the leaky transmission line 16. This implementation is consistent with FCC frequency band allocations for spread spectrum transmissions, as the 902–928 MHz region is one of the ISM bands allocated for spread spectrum use by the FCC.

In the first frequency band, radio signal communication is implemented from the control station 18 to the radio units 12 without interfering with the signals in the second frequency band and without exceeding FCC restrictions. Based on the spreading factor, spread spectrum communication can spread the signal over the entire frequency band. In addition, based on available bandwidth of the frequency band, it is possible to provide for different spreading factors up to that factor that will spread the signal over the entire band. This causes both transmit and receive signals to interfere with one another if they are carried simultaneously in a single 26 MHz region, such as the desirable 902–928 MHz region which is the most practical region. As will be discussed, FCC requirements restrict use of frequencies outside the ISM bands.

The present invention overcomes this problem, through proper selection of the frequency bands and appropriate power level selection. With the second frequency band assigned to the 902–928 MHz region, the first frequency band is selected in one of two ways. First, it can be selected from a region outside of those bands which are designated as restricted by the FCC (i.e., a non-restricted region). Second, it can be selected as the 2400-2483.5 MHz ISM band if consideration is given to increase power to overcome attenuation and coupling loss. Within that non-restricted region, the transmitted signal power level is maximum at the point that the signal is coupled to the leaky transmission line to the extent possible without exceeding the FCC power restrictions concerning intentional radiators. Within the 2400-2483.5 MHz ISM band, consideration is given to increasing the power level of the signal in order to increase the length of the leaky transmission line and/or to increase the distance between the leaky transmission line and the radio units.

The following tables, Tables 1 and 2, are provided to illustrate how the first frequency band may be selected. Tables 1 and 2 respectively list the FCC restricted bands below 2 GHz and the available (or non-restricted) frequency bands for intentional radiation between 960 MHz and 2.2 GHz.

TABLE 1

FCC Restricted Bands Below 2 GHz
Frequencies in MHz

| | |
|---|---|
| 0.090-0.110 | 162.0125-167.17 |
| 0.49-0.51 | 167.72-173.2 |
| 2.1735-2.1905 | 240-285 |
| 8.362-8.366 | 322-335.4 |
| 13.36-13.41 | 399.9-410 |
| 25.5-25.67 | 608-614 |
| 37.5-38.25 | 960-1240 |
| 73-75.4 | 1300-1427 |
| 108-121.94 | 1435-1626.5 |
| 123-138 | 1660-1710 |
| 149.9-150.05 | 1717.8-1722.2 |
| 156.7-156.9 | |

TABLE 2

Non-restricted Bands Between
960 MHz and 2.2 GHz

| Available Band Frequency in MHz | Bandwidth in MHz |
|---|---|
| 1240-1300 | 60 |
| 1427-1435 | 8 |
| 1626.5-1660 | 33.5 |
| 1710-1717.8 | 7.8 |
| 1722.2-2200 | 477.8 |

Preferably, the first frequency band, for transmission to the radio units 12, is selected from this set of bands in Table 2.

Maximizing the transmitted signal power level at the point that the signal is coupled to the leaky transmission line requires the acknowledgement of two parameters. These are the FCC power restrictions concerning spread spectrum radio transmissions and the losses associated with the leaky transmission line. Presently, the FCC power restrictions are based on a limit of power delivered to the antenna. This restriction is sometimes interpreted as the equivalent of a signal field strength at a distance of three meters from the antenna. Due to losses associated with leaky transmission line, when using leaky coaxial cable rather than an antenna, the power delivered to the antenna (or leaky transmission line) does not correspond directly to the signal field strength at a distance of three meters. Thus, it possible to deliver more power to the leaky coaxial cable than to other more conventional antenna-like devices. In any case, the signal loss through the leaky transmission line should be calculated and this power level implemented accordingly.

With regard to the losses associated with leaky transmission line, there are two primary characteristics that define such losses. These characteristics are attenuation and coupling loss. Attenuation is the measure of the signal loss along the cable, and it is normally specified in decibels (dB) per 100 feet. Attenuation values range from fractional parts of 1 dB at low frequencies for large cable sizes to above 11 dB for higher frequencies for small cable sizes.

Coupling loss is related to the measure of the signal which is radiated from the leaky coaxial cable and is defined as the difference between the signal level in the cable and the signal level received by a 0 dB gain antenna. Coupling loss is commonly specified in dB at a specified distance typically, 20 feet or approximately 6.1 meters, from the cable. Coupling loss varies significantly along the length of the cable due to the geometry of the location in which it is mounted. Conventional cables have coupling losses greater than 50 dB, and loss values are commonly in the range of 60 to 90 dB. Generally, lower coupling values result in higher internal/longitudinal attenuation.

Table 3 (below) lists the attenuation and coupling losses for popular RADIAX ® cables available from Andrew Corp., Orland Park, IL.

TABLE 3

Attenuation and Coupling Losses
for Popular Andrew RADIAX ® Cables

| Cable Type | Frequency MHz | Attenuation dB/100 ft | Coupling Loss at 20 ft dB |
|---|---|---|---|
| RX1-2 | 30 | 1.1 | 57 |
| | 150 | 3.1 | 55 |
| | 450 | 6.6 | 64 |
| | 900 | 9.6 | 67 |
| | 1700 | Not Recommended | Not Recommended |
| RXL2-2 | 30 | 0.65 | 65 |
| | 150 | 1.6 | 56 |
| | 450 | 3.0 | 61 |
| | 900 | 4.3 | 68 |
| | 1700 | 6.3 | 74 |
| RXL4-1 | 30 | 0.33 | 62 |
| | 150 | 0.94 | 58 |
| | 450 | 2.1 | 63 |
| | 900 | 3.4 | 68 |
| | 1700 | 5.6 | 73 |
| RXL5-1 | 30 | 0.21 | 65 |
| | 150 | 0.54 | 58 |
| | 450 | 1.1 | 63 |
| | 900 | 1.9 | 69 |
| | 1700 | 3.1 | 72 |
| RXL6-1 | 30 | 0.17 | 68 |
| | 150 | 0.39 | 59 |
| | 450 | 0.80 | 66 |
| | 900 | 1.4 | 71 |
| | 1700 | 2.3 | 73 |
| RXL7-1 | 30 | 0.15 | 63 |
| | 150 | 0.33 | 61 |
| | 450 | 0.61 | 68 |
| | 900 | 1.0 | 72 |
| | 1700 | 2.7 | 77 |

As will be described in detail below, the above tables may be used to determine the maximum signal power level at the point that the signal in the first frequency band is coupled from the repeater 14 to the leaky transmission line 16, in view of the FCC power restrictions. This determination may be made for any arrangement of leaky transmission line.

If desirable or necessary, the maximum signal power level at the point that the signal in the first frequency band is coupled from the repeater 14 to the leaky transmission line 16 may also be determined using the criteria of a signal field strength at a distance of three meters from the antenna. For example, using the FCC intentional radiation emission limit for any given frequency, the field strength at the applicable distance from the leaky transmission line may be measured while adjusting the signal power level applied thereto from the repeater. These FCC radiation emission limits are provided below in Table 4:

TABLE 4

F.C.C. Intentional Radiation Emission Limits:

| Frequency MHz | Field Strength microvolts/meter | Measurement Distance meters |
|---|---|---|
| 0.009–0.490 | 2,400/F (kHz) | 300 |
| 0.490–1.705 | 24,000/F (kHz) | 30 |
| 1.705–30.0 | 30 | 3 |
| 30–88 | 100 | 3 |
| 88–216 | 150 | 3 |
| 216–960 | 200 | 3 |
| Above 960 | 500 | 3 |

Use of the above tables is demonstrated in the following example, in which a link budget is calculated to provide the maximum signal power level at the point that the signal is coupled from the repeater 14 to the leaky transmission line 16. In such a calculation, three fundamental constraints should be taken into account. These are the level of signal allowed by the FCC, the maximum required distance between line repeaters (amplifiers), and the maximum required standoff distance from the leaky feeder for radio unit coverage; each is properly considered in the example.

The example includes the first frequency band being selected from Table 2 as the 1240–1300 MHz (1250 MHz) band, and the second frequency band being selected as the 902–928 MHz ISM band. Thus, Table 4 would require a signal strength of no more than 500 microvolts/meter ($\mu V/m$) at 3 meters from the leaky transmission line. This restriction for the 1240–1300 MHz band is defined by the FCC in Part 15, Subpart C -Intentional Radiators, Section 15.209, as 500 $\mu V/m$ at 3 meters. Further, assuming the use of 1¼ inch leaky feeder (e.g., Andrew Corporation RXL-6 Radiax ®), a coaxial mode power of approximately −17 dBm will result in a field strength of 500 $\mu V/m$ at 3 meters. At 1250 MHz, the longitudinal attenuation of this leaky feeder is 6.0 dB per 100 meters, and the coupling loss at 20 feet (6.1 meters) is 72 dB. For a radio unit receiver sensitivity of −102 dBm, the following link budget for the repeater (amplifier) to radio unit path is derived assuming the worst case conditions of being at the farthest point from an amplifier and a 5 dB null in the leaky feeder.

| | |
|---|---|
| Line Amplifier Output Power | −17.0 dBm |
| RADIAX ® Attenuation for 100 feet | −1.8 dB |
| RADIAX ® Coupling Loss at 20 feet | −72.0 dB |
| Coupling Loss Variation | −5.0 dB |
| Signal Power at Radio Unit | −95.8 dBm |
| Receiver Sensitivity | −102.0 dBm |

The difference between the signal power at the radio unit and the receiver sensitivity is 6.2 dB; this is the "link margin," which permits an overall variation from these calculations of up to 6.2 dB, while ensuring reception by the radio units at distances of not more than 20 feet from the leaky transmission line.

Figure 2:
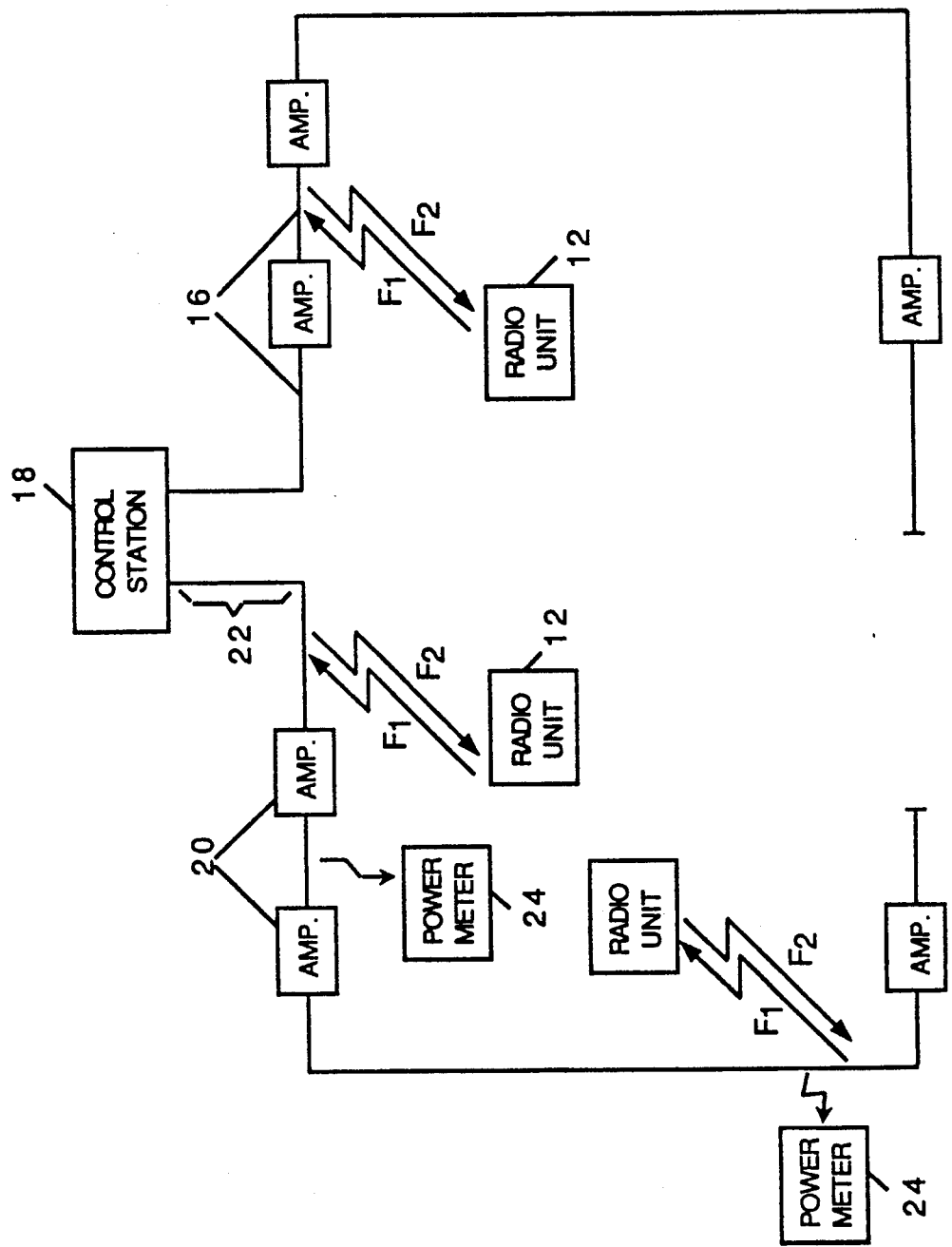
FIG. 2 is a block diagram of another radio communication system, illustrating other aspects of the present invention.

In FIG. 2, another radio communication arrangement using leaky transmission line is illustrated in accordance with the present invention. This arrangement is similar to that shown in FIG. 1 and includes common elements. The control station 18 in FIG. 2 may be viewed as incorporating the repeaters 14 referred to in connection with FIG. 1. Two additional elements, not shown in FIG. 1, are a non-leaky length of transmission line 22 and a conventional amplifier 20. The non-leaky length of transmission line 22 is useful for areas in which radio unit coverage is not necessary.

Each amplifier 20 is used to boost the level of the signals traveling in the leaky transmission line 16 to provide maximum signal power levels without exceeding FCC power restrictions. Due to the coupling and attenuation losses which are inherent to the leaky transmission line, these amplifiers 20 may be required depending on the lengths of each leaky transmission line 16.

Also included in FIG. 2 is a conventional power meter 24 for measuring the signal strength at a specified distance from the leaky transmission line 16. Such measurements may be used to implement the power levels in accordance with the FCC radiation emission limits (as listed above in Table 4), with each amplifier 20 being adjusted to meet the FCC guidelines.

Alternatively, interpreting the FCC spread spectrum power restrictions as limiting the power delivered to the antenna to be the equivalent of that which will produce a given signal field strength at a predetermined distance from the leaky transmission line 16, each amplifier 20 may be adjusted to amplify the signals such that it compensates for the losses in the leaky transmission line 16. Such an interpretation may be used to deliver more than one Watt of signal power to the leaky transmission line 16. This additional power allows for an increased distance between the amplifiers 20, and, therefore, makes the system more practical for operation in the 2400–2483.5 MHz ISM band.

The following example demonstrates the maximum distance between amplifiers 20 for a spread spectrum system using the 2400–2483.5 MHz ISM band for the first frequency band (communication to the radio units), and the 902–928 MHz ISM band for the second frequency band (communication from the radio units). The allowable signal level for spread spectrum operation in the 2400–2483.5 MHz ISM band is defined in Part 15, Subpart C - Intentional Radiators, Section 15.247, as one Watt. As in the previous example, the maximum required longitudinal distance between line amplifiers, and the maximum required standoff distance from the leaky feeder for radio unit coverage are accounted for in the example itself.

In this example, a 1¼ inch leaky transmission line (e.g., Andrew Corporation RXL-6 Radiax ®) is used for the repeater (amplifier) to radio unit communications path at 2400 MHz. At 2400 MHz, the longitudinal attenuation of this leaky feeder is 10.05 dB per 100 meters and the coupling loss at 20 feet (6.1 meters) is 74 dB. For a receiver sensitivity of −102 dBm, the following repeater (amplifier) to radio unit communications path link budget is derived.

| | |
|---|---|
| Line Amplifier Output Power | +30.0 dBm |
| RADIAX ® Attenuation for 1230 feet | −37.7 dB |
| RADIAX ® Coupling Loss at 80 feet | −86.0 dB |
| Coupling Loss Variation | −5.0 dB |
| Signal Power at Radio Unit | −98.7 dBm |
| Receiver Sensitivity | −102.0 dBm |

In this example, the link margin is 3.3 dB with reception by the radio units at distances from the leaky transmission line of 80 feet or less. Although this example includes introducing to the leaky transmission line a spread spectrum signal having a power level of only one Watt, using additional power will allow for more distance between the amplifiers and/or greater distance between the leaky transmission line and the radio units.

Accordingly, the present invention realizes a practical implementation of a communication system which uses and enjoys all the advantages associated with both leaky transmission line and spread spectrum communication. Not only is this invention well suited for any leaky coaxial arrangement, reduced costs are realized in larger application using the additional power that is available in the previously discussed interpretation of the FCC restrictions for spread spectrum communication.

While the invention has been particularly shown and described with reference to various embodiments, it will be recognized by those skilled in the art that other modifications and changes may be made to the present invention described above without departing from the spirit and scope thereof. As an example, other bands could be used in place of those discussed above in connection with FIGS. 1 and 2. More specifically, the present invention contemplates using the 906–928 MHz ISM band for communication from the radio units, and using the 906–928 MHz ISM band for communication to the radio units.

What is claimed is:

1. A communication system, comprising:
   a predetermined length of leaky transmission line for receiving, propagating and transmitting spread spectrum radio signals in a prescribed coverage area adjacent a selected section of said length;
   transceiver means, coupled to the leaky transmission line, for providing spread spectrum signals to the leaky transmission line in a first frequency band and at a first predetermined power level; and
   a plurality of radio units, situated within the prescribed coverage area, for receiving the spread spectrum signals transmitted from the leaky transmission line in the first frequency band and for transmitting spread spectrum signals to the transceiver means, via the leaky transmission line, in a second frequency band, wherein the first and second frequency bands are not adjacent;
   wherein the leaky transmission line is constructed such that its length and type decreases the first predetermined power level to a second preselected power level at said selected section, said second preselected power level being about one watt or less so as not to encroach power restrictions concerning transmission of spread spectrum signals.

2. A communication system, according to claim 1, wherein the leaky transmission line includes a coaxial cable perforated with slot-like apertures.

3. A communication system, according to claim 1, wherein the transceiver means includes an amplifier for amplifying the spread spectrum signals before they are transmitted to the radio units through the leaky transmission line.

4. A communication system, according to claim 1, wherein the radio units include mobile radios.

5. A communication system, according to claim 1, wherein the radio units include portable radios.

6. A communication system, according to claim 1, wherein the second frequency band is between 902 MHz and 928 MHz, and the first frequency band is a non-restricted band between 1240 MHz and 2200 MHz.

7. A communication system, according to claim 6, wherein the leaky transmission line is designed to propagate signals at frequencies less than about 2200 MHz.

8. A communication system, according to claim 6, wherein the second frequency band is between 902 MHz and 928 MHz and the first frequency band is between 2400 MHz and 2483.5 MHz.

9. A communication system, according to claim 6, wherein the spread spectrum communication between the radio units and the transceiver means includes frequency hopping coding.

10. A full-duplex communication system, comprising:
    a leaky coaxial cable for carrying, transmitting and receiving spread spectrum radio signals throughout a prescribed coverage area;
    a transceiver, coupled to the leaky coaxial cable, for transmitting spread spectrum signals in a first frequency band having a lower frequency greater than about 1240 MHz and for receiving spread spectrum radio signals in a second frequency band between about 902 MHz and 928 MHz, wherein the spread spectrum radio signals transmitted from the transceivers, at least one point, are carried by the leaky coaxial cable at a first power level;
    wherein the leaky coaxial cable decreases the first power level of the spread spectrum signals transmitted from the transceiver below a predetermined second power level, less than the first power level, by the time the spread spectrum signals radiate from the leaky coaxial cable; and
    a plurality of radio units for receiving the spread spectrum radio signals transmitted through the leaky coaxial cable within the prescribed coverage area and for transmitting in the second frequency band spread spectrum radio signals at a third power level through the leaky coaxial cable to the transceiver.

11. A communication system, according to claim 10, wherein the spread spectrum communication between the transceiver and the radio units includes frequency hopping coding.

12. A communication system, according to claim 10, wherein the communication between the transceiver and the radio units is provided in part by an amplifier to boost the signals carried within the leaky coaxial cable.

13. A communication system, according to claim 10, wherein transmissions at the second power level does not require an FCC license.

14. A full-duplex communication system, comprising:
    a leaky coaxial cable for carrying, transmitting and receiving spread spectrum radio signals throughout a prescribed coverage area;
    a transceiver, coupled to the leaky coaxial cable, for transmitting spread spectrum signals in a first frequency band between about 2400 MHz and 2483.5 MHz and for simultaneously receiving spread spectrum radio signals in a second frequency band between about 902 MHz and 928 MHz, wherein the spread spectrum radio signals transmitted from the transceiver at least one point are carried by the leaky coaxial cable at a first power level which may be greater than 1 Watt; and
    a plurality of radio units for receiving the spread spectrum radio signals transmitted through the leaky coaxial cable within the prescribed coverage area and for transmitting the spread spectrum radio signals through the leaky coaxial cable to the transceiver in the second frequency band;

wherein the leaky coaxial cable decreases the power level of the spread spectrum radio signals in the first frequency band to a level less than about 1 Watt, by the time the spread spectrum signals radiate from the leaky coaxial cable.

15. A method of communication between a radio unit and a transceiver, comprising the steps of:

providing a transmission line, including a leaky transmission line, for receiving, propagating and transmitting spread spectrum radio signals in a prescribed coverage area, said transmission line having coupling loss and attenuation loss factors associated therewith;

selecting a first predetermined power level as a maximum level for signals transmitted from the leaky transmission line;

determining a second predetermined power level, as a function of the first predetermined power level and said coupling loss and attenuation loss factors, as a maximum level for signal transmission from the repeater;

coupling the transceiver to the leaky transmission line to provide spread spectrum signals to the leaky transmission line in a first frequency band and at the second predetermined power level; and situating the radio unit within the prescribed coverage area to receive the spread spectrum signals transmitted from the transceiver via the leaky transmission line and to transmit spread spectrum signals to the transceiver means via the leaky transmission line in a second frequency band.

16. A method of communication, according to claim 15, wherein the second predetermined power level is determined, at least in part, according to an attenuation loss factor associated with the transmission line.

17. A method of communication, according to claim 15, wherein the second predetermined power level is determined, at least in part, according to a coupling loss factor associated with the leaky transmission line.

18. A method of communication, according to claim 15, wherein the second predetermined power level is determined, at least in part, according to an attenuation loss factor of the transmission line.

19. A method of communication, according to claim 18, wherein the first predetermined power level is selected, at least in part, according to FCC specifications associated with spread spectrum radio communication.

20. A method of communication, according to claim 15, wherein the first predetermined power level is selected, at least in part, according to FCC specifications associated with spread spectrum radio communication.

21. A method of communication, according to claim 15, wherein the first and second frequency bands include different ratios of modulated signal bandwidth to the spread spectrum signal bandwidth.

22. A full-duplex communication system, comprising:

a leaky coaxial cable for carrying, transmitting and receiving spread spectrum radio signals throughout a prescribed coverage area;

a transceiver, coupled to the leaky coaxial cable, for transmitting spread spectrum signals in a first frequency band between about 902 MHz and 928 MHz and for simultaneously receiving spread spectrum radio signals in a second frequency band between about 2400 MHz and 2483.5 MHz, wherein the spread spectrum radio signals transmitted from the transceiver at least one point are carried by the leaky coaxial cable at a first power level which may be greater than 1 Watt; and a plurality of radio units for receiving the spread spectrum radio signals transmitted through the leaky coaxial cable within the prescribed coverage area and for transmitting the spread spectrum radio signals through the leaky coaxial cable to the transceiver in the second frequency band;

wherein the leaky coaxial cable decreases the power level of the spread spectrum radio signals in the first frequency band to a level less than about 1 Watt, by the time the spread spectrum signals radiate from the leaky coaxial cable.

* * * * *